United States Patent [19]

Kawate et al.

[11] Patent Number: 4,486,700
[45] Date of Patent: Dec. 4, 1984

[54] UNIVERSAL SINGLE PHASE MOTOR STARTING CONTROL APPARATUS

[75] Inventors: Keith W. Kawate; John A. Haug, both of North Attleboro, Mass.

[73] Assignee: Texas Instruments Incorporated, Dallas, Tex.

[21] Appl. No.: 492,538

[22] Filed: May 9, 1983

[51] Int. Cl.³ ............................................. H02P 1/44
[52] U.S. Cl. .................................... 318/781; 318/787
[58] Field of Search ............... 318/778, 781, 785–787, 318/789–790, 797

[56] References Cited

U.S. PATENT DOCUMENTS

| | | |
|---|---|---|
| 3,414,789 | 12/1968 | Prouty . |
| 3,421,064 | 1/1969 | Phillips . |
| 3,508,137 | 4/1970 | Lewus .................................. 318/787 |
| 3,671,830 | 6/1972 | Kruper . |
| 3,740,631 | 6/1973 | Fricker et al. ...................... 318/787 |
| 3,746,951 | 7/1973 | Hohman . |
| 3,777,232 | 12/1973 | Woods et al. . |
| 4,307,327 | 12/1983 | Streater et al. . |

OTHER PUBLICATIONS

Using the Triac for Control of A.C. Power, by Galloway in Application Eng., 3/66, pp. 15 & 16.

*Primary Examiner*—E. A. Goldberg
*Assistant Examiner*—A. Evans
*Attorney, Agent, or Firm*—John A. Haug; James P. McAndrews; Melvin Sharp

[57] ABSTRACT

A starting circuit for single phase electric motors including both split-phase and capacitor start motors includes a gate controlled solid state switch serially connected to the start winding of the motor. Rectified reference pulses from a pulse transformer are generated to turn on a first transistor to provide gating current for the solid state switch. Initially, when the motor is energized at zero rpm, the pulses are received at the switch after the start winding current passes through the zero current level to gate the switch to conduct each half cycle and energize the start winding however as the motor speeds up, the pulses are received earlier and earlier relative to the start winding current zero cross over until at a selected speed the pulses are received at the switch prior to the start winding current zero cross over with the result that the switch is no longer gated conductive. When this occurs the voltage across the switch goes high. This voltage is rectified and received at the base of a second transistor adapted to shunt the pulses from the pulse transformer away from the first transistor to lock out the switch with the start winding deenergized. In a first embodiment the pulse transformer is energized by the main winding current to directly employ the phase difference between main winding current and start winding current while in a second embodiment the pulse transformer is energized by line current to directly employ the phase difference between line current and start winding current.

12 Claims, 5 Drawing Figures

UNIVERSAL SINGLE PHASE MOTOR STARTING CONTROL APPARATUS

CROSS REFERENCE

The subject matter of this application is also contained in U.S. Ser. No. 492,537 filed of even date herewith.

BACKGROUND OF THE INVENTION

This invention relates generally to single phase electric motor starters and more particularly to a universal motor starter for such motors.

The utilization of solid state switches for motor starting to improve reliability and longevity over conventional electromechanical relays is well known. Typically a gate controlled solid state switch, such as a triac, is serially connected to the start winding of a motor and is adapted upon initial energization of the motor to be gated into a low impedance state thereby permitting current flow in the start winding. After a brief period of time the gating current to the triac is interrupted causing the triac to go into a high impedance state to effectively deenergize the start winding. Many different approaches have been made, with varying degrees of success, to utilize one or more characteristics of the motor to prevent conduction of the triac and hence effect deenergization of the start winding at the optimum moment. For example, as disclosed in General Electric Application Note 200.35-3/66 page 16, line current is used to turn on the triac which drops out once the current settles down to normal levels. In U.S. Pat. No. 3,414,789 to Prouty main winding current is used to control the conductive state of the triac by means of the voltage across an impedance serially connected to the main winding. In U.S. Pat. No. 3,671,830 to Kruper the voltage across the start winding is used to control conduction of the triac through a Schmitt trigger arrangement. In U.S. Pat. No. 3,421,064 to Phillips a control winding, magnetically coupled to the main winding, develops a voltage vector which is compared with a voltage vector developed across a portion of the main winding with the vector difference used to control the conduction of the triac. In U.S. Pat. No. 3,746,951 to Hohman impedance elements are connected across the main winding to monitor motor speed by sensing the relative phase difference between start winding current and applied voltage to control the conductive state of the triac. U.S. Pat. No. 3,777,232 to Woods et al also employs phase angle relationships to control conduction of the triac by comparing the phase difference between main winding current and applied voltage in one embodiment and between main winding current and start winding current in another embodiment. In U.S. Pat. No. 4,307,327 to Streater et al the phase angle between start winding current and line current is used to trigger the triac through a reed switch disposed in the trigger circuit of the triac.

All of the above approaches suffer from one or more limitations with regard to their usefulness. For example, in several of the above including the General Electric approach, Prouty and Kruper, variations in voltage supply and loading effect the motor speed at which the start winding is deenergized resulting in inconsistent performance. Another disadvantage common to several of the circuits is that they require specific tailoring for them to be effective for a given motor. This is true of Phillips, Streater et al and Hohman. The approach of Woods et al suffers from a reliability problem since a triac is located in the main winding circuit and is adapted to be energized concomittantly with the main winding. The Woods et al circuit is also relatively complex and is inherently expensive due to the many components employed therein.

In addition to the above noted disadvantages, many of the above noted prior art circuits permit reenergization of the start winding under certain conditions to provide extra torque however in many applications, this can have an adverse effect on reliability and longevity which, as mentioned supra, are two of the main reasons for using triacs. For example, in cases where the motor might be subjected to continuous restarting, particularly under a heavy load such as a stall condition, there is a danger that the junction temperature of the triac could rise too high and the triac burn out.

SUMMARY OF THE INVENTION

It is therefore an object of the present invention to provide a single phase electric motor starter which does not have the prior art limitations mentioned above. Another object is the provision of a solid state motor starter which is reliable yet simple and economical. Yet another objective is the provision of a motor starter which can be used with both split-phase and capacitor start motors and which can be used with a whole class of motors without any need for tailoring to a specific application. Still another objective is the provision of a motor starter which has a positive lockout capability to prevent reenergization of the start winding until the motor is deenergized.

Briefly, in accordance with the invention a gate controlled solid state switch is serially connected to the start winding of a single phase motor. A pulse transformer provides a narrow pulse each time, in one embodiment, the main winding current crosses zero which pulses are rectified and fed to a first transistor disposed in the gate circuit of the solid state switch. As long as the main winding current pulses are received at the triac after the start winding current crosses zero, the triac is fired for most of each half cycle. As the speed of the motor increases, the phase difference between the main winding current and start winding current decreases until at a point generally between 65 and 85% of synchronous speed, depending on the motor, the main winding current pulses are received at the solid state switch before the start winding zero cross over so that the triac is essentially not turned on for that half cycle. When that occurs, the high voltage appearing across the triac is rectified and fed to a second transistor which is then turned on and shunts the pulses away from the first transistor to positively lock out energization of the solid state switch.

In a second embodiment the pulse transformer is adapted to provide the pulses when line current crosses zero and, with the pulses used in the same manner as in the first embodiment, results in narrower, sharper pulses and less torque loss since the switching of the solid state switch occurs closer to the zero cross over of the start winding current.

These and other objects, features and advantages of the present invention may be more clearly understood through a consideration of the following detailed description. In the course of this description, reference will be made to the attached drawings in which:

DESCRIPTION OF THE PREFERRED EMBODIMENTS

Figure 1:
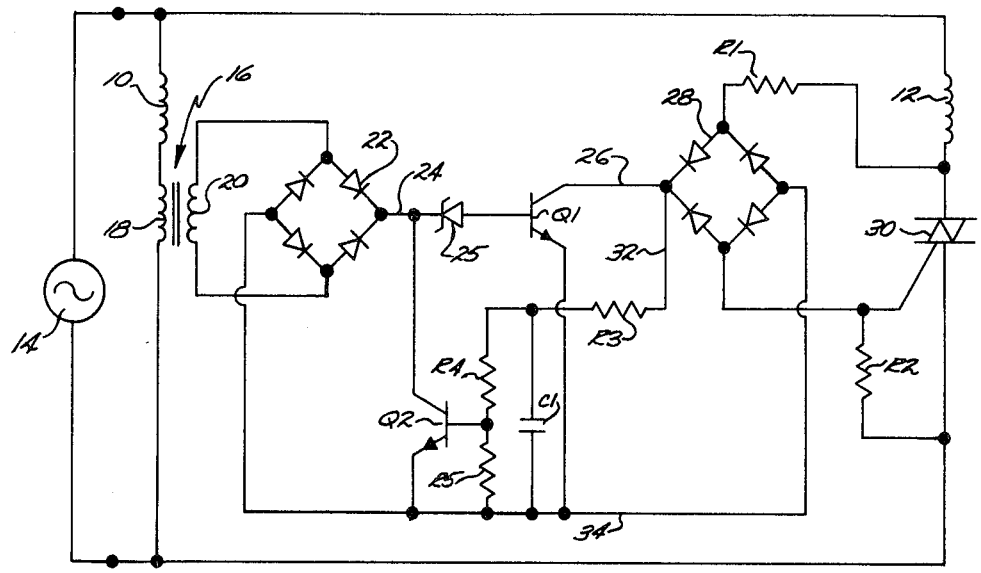
FIG. 1 is a schematic diagram of a preferred control circuit according to the invention in which the change with motor speed of the phase angle between main winding current and start winding current is directly utilized to control energization of the start winding.

As seen in FIG. 1, a single phase induction motor comprising a main winding 10 and a start winding 12 is adapted to be energized by a source of alternating current 14. A pulse transformer 16 comprises a coil 18 connected serially to main winding 10 and a secondary 20 coupled to a full wave diode bridge rectifier 22. Pulse transformer 16 has a toroid wound with thin magnetic tape having a square hysteresis so that pulses are outputted every time the main winding current crosses zero. The output 24 of diode bridge 22 is connected to the base of a first NPN transistor Q1 through a zener diode 25 which serves as a threshold to eliminate any noise problems. The main electrodes of a triac 30 are serially connected to start winding 12. A resistor R2 is connected between one main electrode of the triac and the gate thereof. A full wave diode bridge rectifier 28 is connected across triac 30 though current limiting resistor R1 and resistor R2 respectively. Diode bridge 28 has a first output 26 connected to the collector of transistor Q1 whose emitter is connected to line 34 extending from rectifier 22 to rectifier 28. A second output of rectifier 28, line 32 is coupled to series connected resistors R3, R4, and R5 in turn connected to line 34. Capacitor C1 is connected to a point intermediate resistors R3 and R4 and to line 34. The base of a second NPN transistor Q2 is connected to a point intermediate resistors R4 and R5 while the collector of transistor Q2 is connected to the output 24 of diode bridge 22 and the emitter is connected to line 34.

Figure 3:
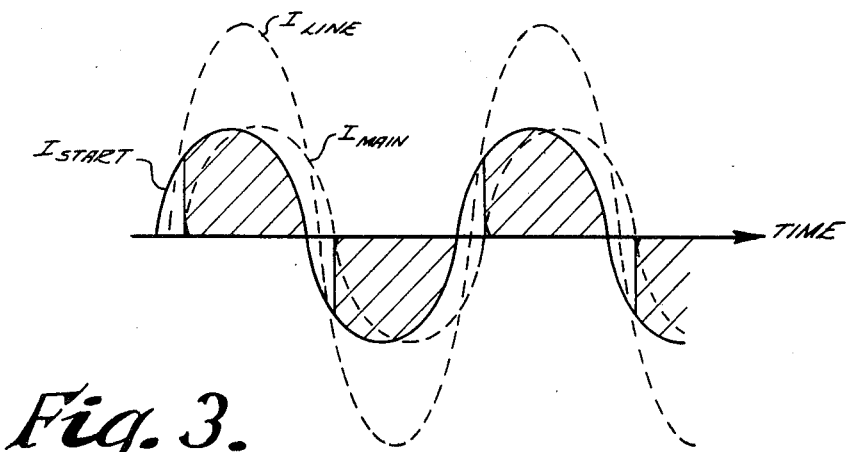
FIG. 3 shows current traces for main winding and start winding currents relative to the firing of the solid state switch upon initial energization of the motor. A current trace for line current is also shown with reference to the second embodiment.
Figure 4:
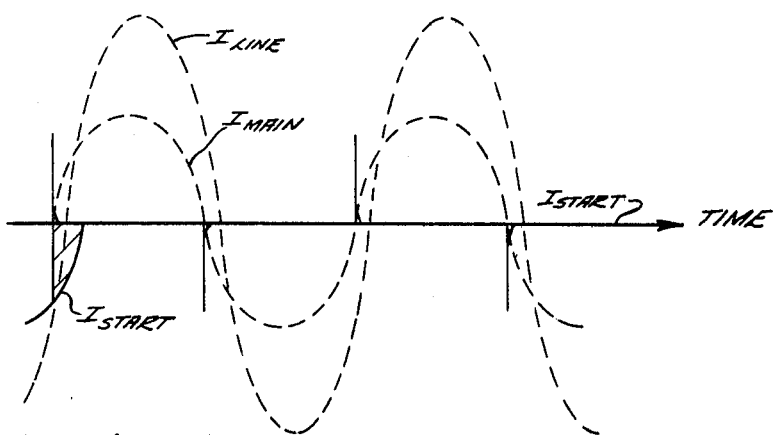
FIG. 4 shows traces similar to FIG. 3 but shown at a time when pulses from the main winding for the first embodiment and from line for the second embodiment reach the triac before the start winding current zero cross over.
Figure 5:
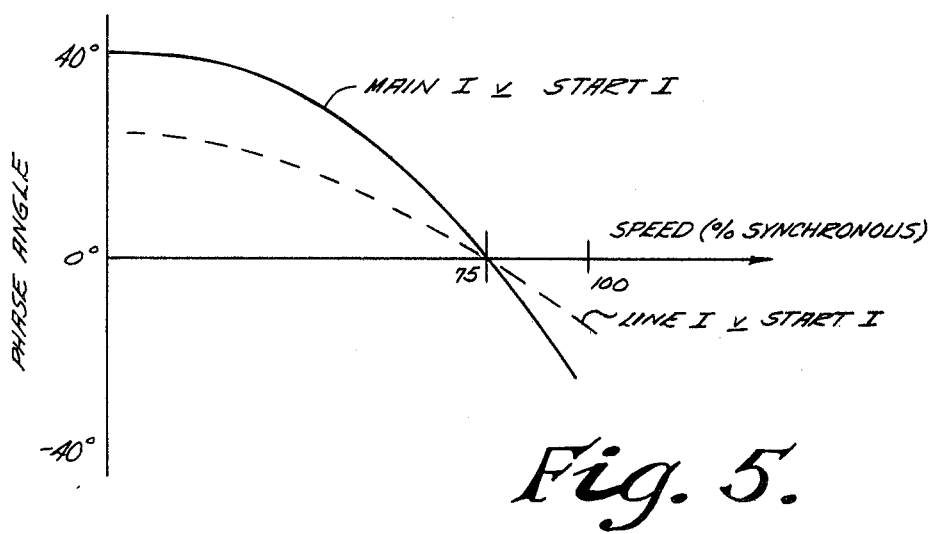
FIG. 5 is a chart showing the phase angle between main winding current and start winding current and between line current and start winding current versus speed of the motor.

When main winding 10 is energized, a pulse is generated by pulse transformer 16 each time the current passes through zero. This pulse is rectified by bridge 22 and pulses transistor Q1 on which turns on bridge 28 which in turn fires triac 30. Current goes through resistor R1, diode bridge 28, transistor Q1, back to the diode bridge 28 to the gate of triac 30. If the pulse occurs after the start winding current crosses zero, as seen in FIG. 3, then the triac is fired for essentially a full half cycle thereby energizing the start winding. As the motor speed increases the phase angle between the main and the start winding current changes until at some point it changes sign and becomes negative with the main winding current crossing zero before the start winding current as seen in FIG. 5 at a point marked 75% of synchronous speed. This point varies from one type of motor to another but generally is between 65% and 85% of synchronous speed. When the pulse generated from the main winding current occurs before the start winding current crosses zero, the triac is essentially off the next half cycle as seen in FIG. 4 and the voltage across triac 30 is high (line voltage, or in the case of a capacitor start motor even higher). This signal is rectified by bridge 28 and charges capacitor C1 through resistor R3 which will turn on transistor Q2 through resistors R4 and R5 to shunt current pulses away from the base of transistor Q1 to thereby lock out triac 30. When triac 30 conducts, there is only a volt or so drop across the triac however as soon as a high voltage appears across the triac, this signal is used to lockout the triac and hence the start winding so that the only way it can be reenergized is to momentarily remove power from the circuit. This lockout capability assures that an overload problem will not cause repetitive reenergization of the start winding which could cause overheating and ultimately destruction of the triac.

One of the principle advantages of the present invention is that by properly choosing the toroid transformer and motor rated triac, the circuit can be applied to a class of motor types, for example fractional horsepower motors from a quarter to three quarters of a horsepower, without need for tailoring to a specific motor or type of motor. When used as a replacement starter, for example, one need only connect the starter to the motor without having to consult the motor manufacturer to determine what starter can be used.

A starter made in accordance with FIG. 1 had the following components:

| winding 18 | 1T #20 | Transistor | Q1 | A5T5058 |
|---|---|---|---|---|
| secondary 20 | 125T #34 | Transistor | Q2 | 2N3904 |
| diodes in rectifier 22 | 1N645 | Capacitor | C1 | 3.3 µf @ 25V |
| zener diode 25 | 1N748A 3.9V | Resistor | R1 | 470 ohms |
| | | Resistor | R2 | 220 ohms |
| diodes in rectifier 28 | 1N 4004 | Resistor | R3 | 100K ohms |
| triac 30 | TIC 246D | Resistor | R4 | 10K ohms |
| | | Resistor | R5 | 3.3K ohms |

Figure 2:
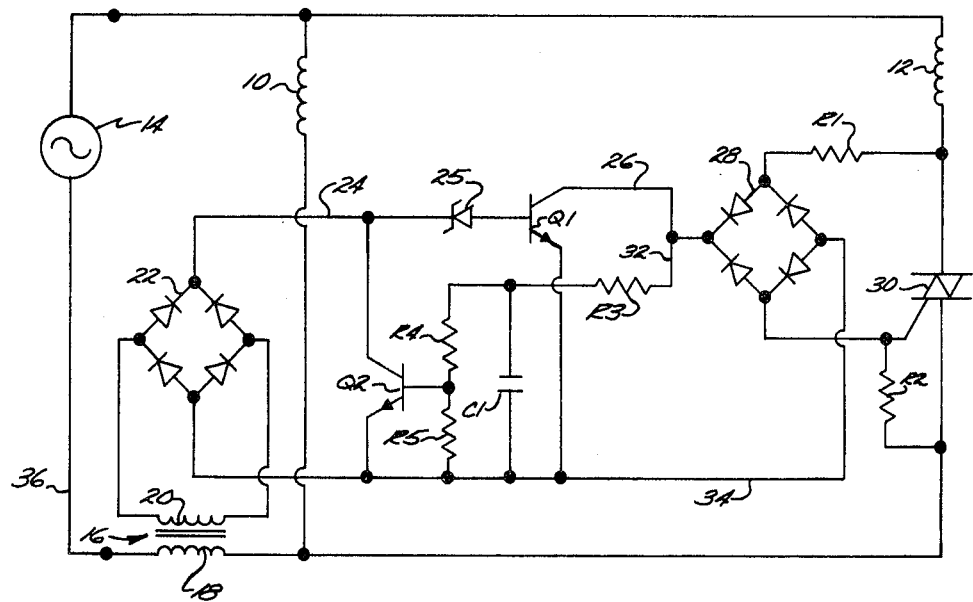
FIG. 2 is a schematic diagram, similar to FIG. 1, of another preferred control circuit according to the invention in which the change with motor speed of the phase angle between line current and start winding current is directly utilized to control energization of the start winding.

Turning now to FIG. 2, it will be noted that winding 18 is placed in the supply line 36 in order to generate pulses every time the line current crosses zero. As seen in FIG. 3, the slope of the line current, $I_{LINE}$, at zero crossing is steeper than for $I_{MAIN}$ so that a sharper, narrower pulse is produced by the toroid thereby providing an even more consistent control than is obtained in the FIG. 1 embodiment. It will also be noted from FIG. 3 that $I_{LINE}$ current crosses zero at a point closer to the zero crossing of $I_{START}$ current, generally speaking, 50% closer. This results in less torque lost during start winding energization. Since the rest of FIG. 2 and its operation is the same as for FIG. 1, the detailed description thereof will not be repeated.

In view of the above it will be seen that the present invention provides a more useful and reliable solid state starter than that of the prior art in that it has universal capability, i.e., can it be applied to difference motor ratings and types without having to be tailored to a specific application, it is independent of line voltage variations due to its use of phase crossing to control firing of the triac, it has a positive lockout capability and through the use of the pulse transformer.

It is within the purview of the invention to fire the triac directly by means of employing a larger toroid transformer to produce higher current level pulses and use the energy derived from the main winding current or line current crossing zero to directly fire the triac if desired, rather than firing the triac by using the voltage across the triac as the energy source.

It is to be understood that the specific embodiments of the invention which have been described are merely illustrative and that numerous modifications may be made by those skilled in the art without departing from the scope of the invention such as varistor protection of components against over voltage surges.

We claim:

1. A control circuit for controlling the energization of the start winding of an electric motor having a main winding and a start winding both connectable with a source of a-c line power comprising:
   pulse transformer means including a coil serially connected to the line to produce a pulse each time line current crosses zero;
   a solid state switch having two main electrodes and a gate electrode, the two main electrodes serially connectable to the start winding to control energization thereof;
   circuit means for energizing the solid state switch responsive to the pulse coupled to the gate electrode and the start winding for rendering the switch conductive for each half cycle of start winding current only as long as the start winding current passes through zero prior to the occurrence of the pulse.

2. A control circuit according to claim 1 further including means for locking out the switch to preclude the switch from conducting when the start winding current passes through zero after occurrence of the pulse.

3. A control circuit according to claim 1 in which the solid state switch is a triac.

4. A control circuit according to claim 3 in which the pulse transformer includes a tape wound toroid.

5. A control circuit according to claim 1 in which the means responsive to the pulse includes a first transistor, the pulse transformer means including a rectifier for rectifying the output of the transformer means, the rectified pulse fed to the base of the transistor, the emitter and collector of the first transistor coupled to the gate electrode of the switch.

6. A control circuit according to claim 5 in which the first transistor is an NPN type and further including another rectifier, the rectifier having an output, the collector of the first transistor connected through the output of the rectifier to a point intermediate the start winding and the switch.

7. A control circuit according to claim 6 including a second transistor, the base of the second transistor coupled to the output of the said another rectifier and adapted to turn on the second transistor when the voltage across the solid state switch is high, the collector, emitter circuit of the second transistor being connected to the rectifier of the pulse transformer and adapted to shunt the pulses away from the first transistor when the second transistor is turned on.

8. A control circuit according to claim 7 further including an R-C circuit coupled between the output of the said another rectifier and the base of the second transistor.

9. A control circuit for controlling the energization of the start winding of an electric motor and for locking out the start winding upon deenergization thereof, the motor having a main winding and a start winding both connectable with a source of a-c line power comprising:
   signal means for providing a signal each time line current crosses zero;
   a traic having two main electrodes and a gate electrode, the two main electrodes serially connectable to the start winding to control energization thereof;
   circuit means for energizing the solid state switch responsive to the signal coupled to the gate electrode and the start winding for rendering the triac conductive for each half cycle of start winding current as long as the start winding current passes through zero prior to the occurrence of the signal;
   lockout means to preclude triac conduction when the start winding current passes through zero after the occurrence of the signal including a transistor having a collector-emitter circuit coupled to the signal means and adapted to shunt the signal away from the said means responsive to the signal when the transistor is turned on, and voltage responsive means coupled to the triac and the base of the transistor so that when there is a high voltage across the triac the transistor will be turned on to thereby lock out the triac.

10. A control circuit according to claim 9 in which the transistor is an NPN transistor.

11. A control circuit according to claim 9 in which the voltage responsive means includes an RC circuit.

12. A control circuit for controlling the operation of an induction motor having a start winding and a main winding energized by an alternating current line source and for deenergizing the start winding in response to a phase crossing between the line current and the start winding current comprising:
   a three terminal solid state switch means having a pair of terminals connectable in series circuit relationship with the start winding and a gate terminal,
   pulse generating means connectable to the line for producing a narrow pulse each time the line current crosses zero,
   trigger circuit means for energizing the solid state switch means, the trigger circuit means having a first transistor coupled to the gate of the solid state switch and adapted to energize the switch when the transistor is conductive, the pulse generating means connected to the first transistor so that a pulse transmitted from the pulse generating means to the first transistor will render it conductive,
   lockout circuit means including a second transistor connected in parallel circuit relationship with the first transistor and means responsive to a preselected voltage across the solid state switch means to turn on the second transistor to shunt the pulses from the pulse generating means away from the first transistor thereby preventing the triggering of the solid state switch and deenergizing the start circuit.

* * * * *